Dec. 11, 1951  R. N. JANEWAY  2,578,137
SUSPENSION
Filed Aug. 29, 1945
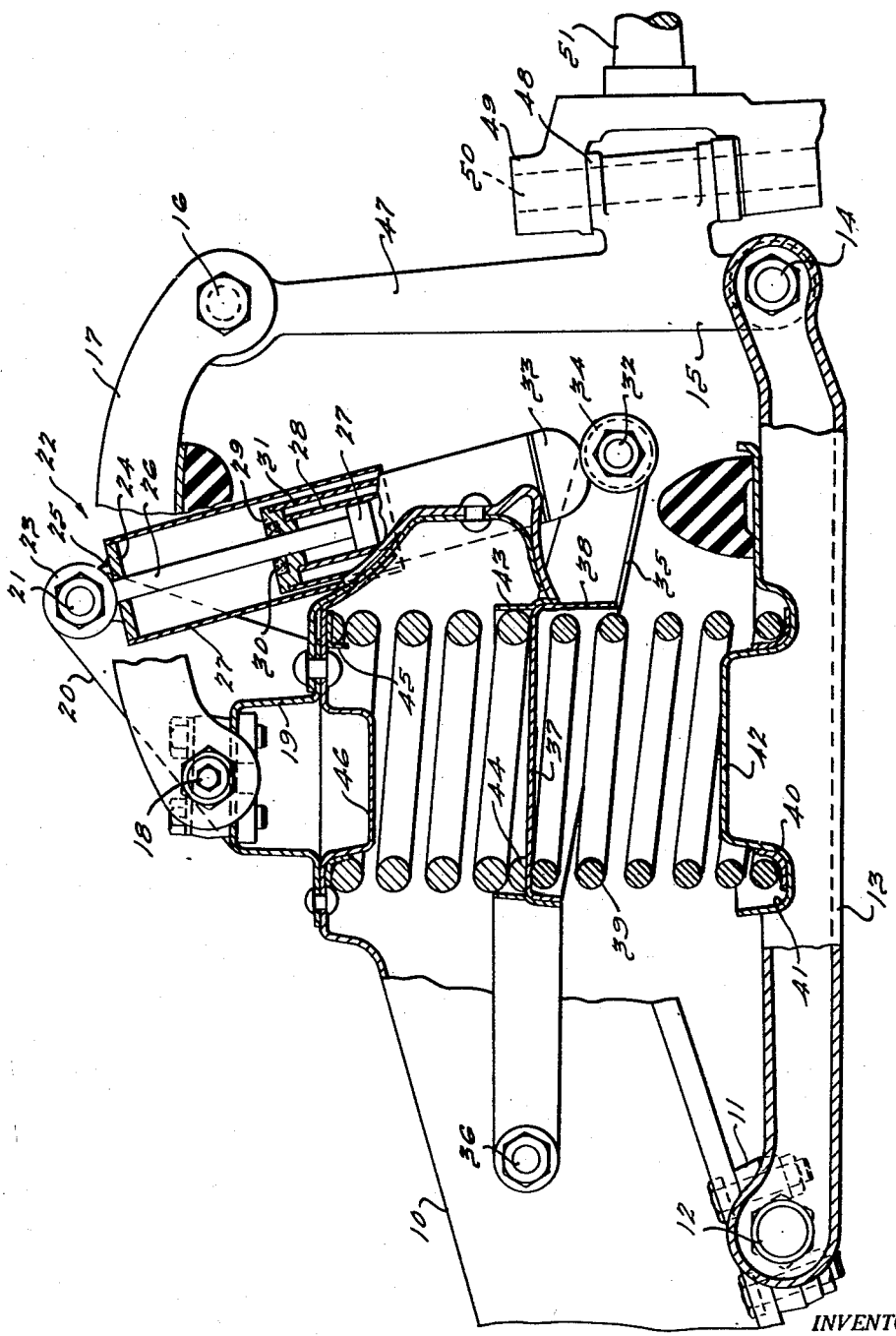
INVENTOR.
Robert N. Janeway.
BY
Harness and Harris
ATTORNEYS.

Patented Dec. 11, 1951

2,578,137

UNITED STATES PATENT OFFICE 2,578,137

SUSPENSION

Robert N. Janeway, Detroit, Mich., assignor to Chrysler Corporation, Highland Park, Mich., a corporation of Delaware Application August 29, 1945, Serial No. 613,291

9 Claims. (Cl. 267—8)

This application relates to an automotive vehicle suspension involving springs and a shock absorber. More specifically, it relates to the employment of such a suspension for the steerable wheels of an automobile.

It is believed that the general practice of connecting hydraulic damping devices across the entire spring suspension of automobiles is responsible not only for direct shock transmission to the car body, which is invariably experienced on bad roads, but also for aggravating vibration and noise, for shock absorbers and particularly those of the fluid or hydraulic type are in reality shock transmitters when they are subjected to impact. When rubber body mountings are used, noise transmission is reduced, but the secondary vibrations of the body are undoubtedly amplified by impacts by-passed through the shock absorbers. I have overcome the above disadvantages by providing a spring series that includes a free and undamped resilient means or spring and a damped resilient means or spring.

An object of the present invention is to apply to an automotive vehicle suspension involving a shock absorber, a spring series made up of a free or undamped spring and a spring damped by the shock absorber. These springs may be of the coil type, and the shock absorber, of the hydraulic or fluid type. With such a series arrangement the shock absorber is adapted to absorb vibrations, and the free spring is enabled to cushion impact which might otherwise be transmitted by being passed around the damped spring by way of the shock absorber.

Another object is to provide improvements in spring suspension to which is applied a shock absorber connected in such a way as to absorb all vibrations and energy upon all relative movement toward and away from one another of the parts between which the shock absorber is connected. This will involve solid connection of the shock absorber to certain parts across which one resilient spring means is connected, the one resilient means being one part of a spring series, the other part of such series being an undamped resilient spring means.

A further object is to provide improvements in a suspension involving links connecting a vehicle frame and a ground wheel, which may be steerable. The suspension will include two spring sections, one of which is free and undamped, and the other has connected in parallel therewith a shock absorber. The shock absorber may be of the fluid or hydraulic type and may be solidly connected at its ends to the parts between which it is to act as a damper.

Other objects will appear from the disclosure.

The reference character 10 designates a frame member of an automotive vehicle. A bracket 11 attached to the frame member supports a bolt 12 forming the pivotal connection of an inner end of a lower long link 13 to the frame member 10. The link 13 may be of the wishbone type. Its outer end is pivotally connected by a bolt 14 to the lower end of a carrying member 15, to the upper end of which is pivotally connected by means of a bolt 16 the outer end of an upper short link 17. The link 17 may be of the wishbone type having spaced portions at its inner end connected by bolts 18, only one being shown, to a bracket 19 secured to the frame member 10. A portion 20 of the bracket 19 projects upwardly a considerable distance and supports a bolt 21 pivotally connecting the upper end of a shock absorber 22 to the bracket portion 20. The shock absorber 22 includes an upper part formed of a ring 23 mounted on the bolt 21, an end member 24 secured thereto by soldering or welding as indicated at 25, a piston rod 26 extending through and secured to the end part 24 and perhaps also to the ring 23, and an outer sleeve 27 suitably attached to the end part 24 and depending therefrom. A conventional shock absorber piston 27, which may have valve-controlled passages extending therethrough, is secured to the lower end of the piston rod 26. The piston is slidably mounted in an inner sleeve 28, the upper end of which is attached to a bushing 29 carrying a seal 30 which acts against the piston rod 26. The upper end of an intermediate sleeve 31 is attached to the bushing 29 and is included in a lower part of the shock absorber pivotally mounted on a bolt 32. The lower part of the shock absorber will also include a base member 33 to which the lower end of the intermediate sleeve 31 is fixed and a ring 34 through which the bolt 32 extends. The upper and lower ends of the shock absorber 22 may also be connected to the bracket portion 20 and the link 35 so that provision is made for any in or out movement of the link 35 with respect to the plane of the drawing.

The bolt 32 is mounted in the outer end of an intermediate support member 35, the inner end of which is pivotally connected to the frame member 10 by means of a bolt 36. The intermediate support member 35 has a seat portion 37 provided with a depending flange 38. The lower side of the seat portion 37 and the flange 38 form a seat for the upper end of a relatively soft coil spring 39, the lower end of which is seated on a flanged ring 40 formed of an inflexible metallic or non-metallic substance, positioned in an annular groove 41 formed in a member 42 mounted upon the lower link 13. A short generally cylindrical part 43 is secured in embracing relation to the depending flange 38 and forms with the upper side of the seat portion 37 a seat for the lower end of a relatively stiff coil spring 44. The upper end of the coil spring 44 rests against a flange ring 45 formed of an inflexible metallic or non-metallic substance, held by the spring 44 against the under side of the top portion of the frame member 10. A depressed portion 46 is formed in the upper portion of the frame member 10 within the coil spring 44.

The outer ends of the upper and lower links 17 and 13 are respectively pivotally connected to the upper and lower ends of a carrying member 47 by means of the bolts 16 and 14. The carrying member 47 has a knuckle-supporting portion 48 upon which rests a knuckle 49. A king pin 50 pivotally connects the knuckle 49 to the knuckle-carrying portion 48. Formed integral with the knuckle 49 is a spindle 51 adapted to carry a steerable wheel, not shown.

The connections of the upper end of the shock absorber 22 to the bracket portion 20 and of the lower end of the shock absorber to the intermediate support member 35 are solid and inflexible axially of the shock absorber, the connections of the ends of the shock absorber to the bracket portion 20 and the link 35 being pivotal or universal. Thus the shock absorber will absorb all vibrations involving movement of the intermediate member 35 toward and away from the bracket portion 20. The shock absorber 22 with its inflexible end connections and the coil spring series 39, 44, the shock absorber being connected across only the spring 44, provides a novel and improved suspension as applied to automotive vehicles and more particularly as applied to vehicles including links connecting a steerable wheel to a body frame member. The shock absorber 22 with its inflexible end connections damps vibrations of any masses associated with the system such as the wheel and its immediately associated parts, the body supported mass or spring mass, and the intermediate mass associated with the spring seats and shock absorber, which vibrations tend to be transmitted through the springs 39 and 44 in series, since any vibration involves displacement of both springs. The free coil spring which in this case happens to be the soft spring is free to cushion impact, since there is no tendency for the shock absorber to by-pass this spring. Although it might appear that this arrangement would not prevent wheel dance, i. e., vibration of wheel and associated mass between the tire and the spring suspension, actually the arrangement will prevent wheel dance, because the series arangement of the springs transmits any displacement of the undamped spring to the damped spring and the shock absorber connected thereacross. This arrangement is desirable because it has been discovered that when a shock absorber is connected entirely across a spring means in a vehicle suspension, the absorber sometimes acts as a shock transmitter rather than as a shock absorber. However, when in the present arrangement the shock absorber is connected across only a portion of the spring suspension means, namely, the upper relatively stiff coil spring 44, the lower relatively soft coil spring 39 is free to cushion the impact that might otherwise be transmitted through a shock absorber connected in parallel with the spring 39. It is also possible to reverse the arrangement of springs, i. e. to make the undamped spring the relatively stiff one and the damped spring the relatively soft one.

I claim:

1. In a vehicle, body-connected structure, an upper link pivotally connected at one end to the body-connected structure, a wheel-carrying member connected to the other end of the upper link, rigid lower link structure having one end pivoted to swing on said body-connected structure and a spring seat portion with an annular spring seat groove formed therein, said rigid lower link structure having the opposite end pivotally connected to the wheel-carrying member, an intermediate member having reception-forming portions adapted for connection with said body-connected structure and rigid lower link structure, a relatively soft interposed coil spring received by one of said intermediate member reception-forming portions and having a remote end seated in the spring seat groove formed in the rigid lower link structure thereby providing a spring connection between the intermediate member and rigid lower link structure, said body-connected structure being provided with spring engagement means, a relatively stiff interposed coil spring received by a second intermediate member reception-forming portion and having a remote end engaging said spring engagement means of the body-connected structure, and a telescopic shock absorber having an articulated mounting at one end detachably connected to the intermediate member and an articulated mounting at the other end detachably connected to said body-connected structure to dampen oscillations of the relatively stiff interposed coil spring.

2. In a vehicle, body-connected structure, an upper link pivotally connected at one end to the body-connected structure, a wheel-carrying member connected to the other end of the upper link, rigid lower link structure having one end pivoted to swing on said body-connected structure and a spring seat portion with an annular spring seat groove formed therein, said rigid lower link structure having the opposite end pivotally connected to the wheel-carrying member, an intermediate member having reception-forming portions adapted for connection with said body-connected structure and rigid lower link structure, a relatively soft interposed coil spring received by one of said intermediate member reception-forming portions and having a remote end seated in the spring seat groove formed in the rigid lower link structure thereby providing a spring connection between the intermediate member and rigid lower link structure, said body-connected structure being provided with spring engagement means, a relatively stiff interposed coil spring received by a second intermediate member reception-forming portion and having a remote end engaging said spring engagement means of the body-connected structure, pivot forming means pivotally connecting said intermediate member to one of said structures for swingably mounting the intermediate member thereupon, and a telescopic shock absorber having an articulated mounting at one end detachably connected to the intermediate member and an articulated mounting at the other end detachably connected to said one structure to dampen the oscillations of the interposed coil spring.

3. In a vehicle, a frame member, a wheel-carrying member, telescoping sleeve structure provided with means forming damping mechanism therein, upper and lower link members connecting the frame and wheel-carrying members, said lower link having means forming a spring seat therein, a coil compression spring seated in the seat means in said lower link and having an end for transmitting thrust of the lower link, an intermediate member pivotally connected at one end to the frame member and engaging the thrust transmitting end of the coil compression spring for receiving thrust of the lower link, a second coil compression spring, said second coil compression spring and said telescoping sleeve structure each having one end operatively connected with the frame member and the other end operatively connected with the intermediate member for cooperatively accommodating relative movement between said intermediate and frame members and being laterally offset one from the other.

4. In a vehicle, a body-connected member, an upper relatively short link pivotally connected at one end to the body-connected member, a lower relatively long link pivotally connected at one end to the body-connected member, a carrier for a steerable wheel connected to the other ends of the links, an intermediate member, a relatively stiff coil compression spring engaging the intermediate member and a region of the body-connected member adjacent the connection of the upper link, said coil spring transmitting compression loads between the intermediate and body-connected members, a relatively soft coil compression spring engaging the intermediate member and a region of the lower link so as to transmit compression loads therebetween, and a telescopic shock absorber having ends connected for pivotal movement with the intermediate member and with the body-connected member to which the stiff coil compression spring is connected and at a region on the said body-connected member spaced relative to the upper link connection aforesaid.

5. In a vehicle having a body-connected member, a three-link individual wheel suspension for one of laterally spaced wheels thereadjacent comprising first, second, and third laterally extending links pivotally connected at their inner ends to the body-connected member for swinging movement respectively about vertically spaced horizontal axes, a vertically disposed carrier for the wheel connected to the outer end of the first and third links, telescoping sleeve structure forming a double-ended shock absorber connected at one end to the body-connected member, said second link having its outer end connected to the other end of shock absorber and having a flat circular intermediate portion, spring seats formed on the body-connected member and on the third link in substantial transverse vertical alignment with the flat circular portion on the second link, and a pair of load springs seated on the respective spring seats one engaging one side of the flat circular portion and the other engaging the opposite side of the flat circular portion on the second link, the spring seated on the third link being compressible to absorb temporary impact shock movement of the third link without causing movement of a corresponding magnitude in the second link to which the body-member-connected shock absorber is connected.

6. In a vehicle having a body-connected member, a three-link individual wheel suspension for one of laterally spaced wheels thereadjacent comprising first, second, and third laterally extending links pivotally connected at their inner ends to the body-connected member for swinging movement respectively about vertically spaced horizontal axes, a vertically disposed carrier for the wheel connected to the outer end of the first and third links, telescoping sleeve structure forming a double-ended shock absorber pivotally connected at one end to the body-connected member, said second link having its outer end pivotally connected to the other end of shock absorber and having a flat circular intermediate portion disposed generally in the plane of the swing axis of the second link, spring seats formed on the body-connected member and on the third link in substantial transverse vertical alignment with the flat circular portion on the second link, and a pair of load springs seated on the respective spring seats one engaging one side of the flat circular portion and the other engaging the opposite side of the flat circular portion on the second link, the spring seated on the third link being compressible to absorb temporary impact shock movement of the third link without causing movement of a corresponding magnitude in the second link to which the body-connected shock absorber is connected.

7. In a vehicle having a body-connected member, a three-link individual wheel suspension for one of laterally spaced wheels thereadjacent comprising first, second, and third laterally extending links pivotally connected at their inner ends to the body-connected member for swinging movement respectively about vertically spaced horizontal axes, a vertically disposed carrier for the wheel connected to the outer end of the first and third links, telescoping sleeve structure forming a double-ended shock absorber connected at one end to the body-connected member, said second link having its outer end connected to the other end of shock absorber and having a flat circular intermediate portion, spring seats formed on the body-connected member and on the third link in substantial transverse vertical alignment with the flat circular portion on the second link, and a pair of load springs seated on the respective spring seats having different spring rates and one engaging one side of the flat circuit portion and the other engaging the opposite side of the flat circular portion on the second link, the spring seated on the body-connected member being relatively stiff and the spring seated on the third link being relatively soft and compressible to absorb temporary impact shock movement of the third link without causing movement of a corresponding magnitude in the second link to which the body-member-connected shock absorber is connected.

8. In a vehicle having a body-connected member, a three-link individual wheel suspension for one of laterally spaced wheels thereadjacent comprising first, second, and third laterally extending links pivotally connected at their inner ends to the body-connected member for swinging movement respectively about vertically spaced horizontal axes, a vertically disposed carrier for the wheel connected to the outer end of the first and third links, telescoping sleeve structure forming a double-ended shock absorber connected at one end to the body-connected member, said second link having its outer end connected to the other end of shock absorber and having a flat circular intermediate portion, spring seats formed on the body-connected member in the region of the first link swing axis and on the third link in substantial transverse vertical alignment with the flat circular portion on the second link, and a pair of coaxial coil load springs in series seated on the respective spring seats one engaging one side of the flat circular portion and the other engaging the body-connected member opposing opposite sides of the flat circular portion on the second link and acting thereagainst and against the region of the first link swing axis on the body-connected member, the spring seated on the third link being compressible to absorb temporary impact shock movement of the third link without causing movement of a corresponding magnitude in the second link to which the body-member-connected shock absorber is connected.

9. In a vehicle, a body-connected member, links extending laterally of said member comprising an upper relatively short link pivotally connected at its inner end to the body-connected member, a lower relatively long link pivotally connected at its inner end to the body-connected member, a carrier for a steerable wheel connected to the other ends of the links, an intermediate member swingably mounted upon the body-connected member, a relatively stiff elastic supporting means between the swingably mounted intermediate member and a region of the body-connected member adjacent the connection of the upper link, a relatively soft elastic supporting means between the swingably mounted intermediate member and the lower link, and damping means connected across only the stiff elastic supporting means to absorb energy upon all relative movement of the parts toward and away from one another between which the said stiff elastic supporting means is connected and to leave the soft elastic supporting means free to cushion impact.

ROBERT N. JANEWAY.

REFERENCES CITED

The following references are of record in the file of this patent:

UNITED STATES PATENTS

| Number | Name | Date |
|---|---|---|
| 1,612,421 | DeRam | Dec. 28, 1926 |
| 1,702,675 | Ventura | Feb. 19, 1929 |
| 1,965,447 | Bell et al. | July 3, 1934 |
| 2,093,259 | Wightman | Sept. 14, 1937 |
| 2,113,382 | Oppenheimer | Apr. 5, 1938 |
| 2,333,096 | Dowty | Nov. 2, 1943 |
| 2,338,478 | Wulff | Jan. 4, 1944 |
| 2,344,896 | Phelps | Mar. 21, 1944 |
| 2,387,732 | Bailey | Oct. 30, 1945 |

FOREIGN PATENTS

| Number | Country | Date |
|---|---|---|
| 400,134 | Great Britain | Oct. 19, 1933 |
| 465,550 | Great Britain | May 10, 1937 |
| 844,796 | France | May 1, 1939 |
| 377,789 | Italy | Jan. 5, 1940 |
| 570,183 | Great Britain | June 26, 1945 |